(12) United States Patent
Okamoto

(10) Patent No.: US 11,579,560 B2
(45) Date of Patent: Feb. 14, 2023

(54) DRIVING FORCE TRANSMISSION MECHANISM AND IMAGE FORMING APPARATUS

(71) Applicant: SHARP KABUSHIKI KAISHA, Sakai (JP)

(72) Inventor: Shohtaroh Okamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/516,573

(22) Filed: Nov. 1, 2021

(65) Prior Publication Data

US 2022/0146980 A1 May 12, 2022

(30) Foreign Application Priority Data

Nov. 6, 2020 (JP) .............................. JP2020-185528

(51) Int. Cl.
*G03G 15/00* (2006.01)
*G03G 21/00* (2006.01)
*F16D 1/00* (2006.01)
*G03G 21/16* (2006.01)
*F16D 1/10* (2006.01)
*G03G 21/18* (2006.01)
*F16D 3/18* (2006.01)

(52) U.S. Cl.
CPC ......... *G03G 21/1647* (2013.01); *F16D 1/101* (2013.01); *F16D 3/185* (2013.01); *G03G 15/80* (2013.01); *G03G 21/1676* (2013.01); *G03G 21/186* (2013.01); *F16D 2001/102* (2013.01)

(58) Field of Classification Search
CPC .. G03G 15/757; G03G 15/80; G03G 21/1647; G03G 21/1676; G03G 21/1857; G03G 21/186; G03G 2221/1657; F16D 1/101; F16D 2001/102; F16D 3/185
See application file for complete search history.

(56) References Cited

U.S. PATENT DOCUMENTS

| | | | |
|---|---|---|---|
| 2018/0356764 A1* | 12/2018 | Kamiya | ............ G03G 21/1685 |
| 2019/0210822 A1* | 7/2019 | Amemiya | |
| 2019/0250550 A1* | 8/2019 | Niikawa | |
| 2019/0265637 A1* | 8/2019 | Shimizu | ............. G03G 21/1647 |
| 2021/0055682 A1* | 2/2021 | Kai | ...................... G03G 15/757 |
| 2022/0066379 A1* | 3/2022 | Koyama | ............ G03G 21/1647 |
| 2022/0107602 A1* | 4/2022 | Yamaguchi | ........ G03G 21/1647 |

FOREIGN PATENT DOCUMENTS

JP 2002-341658 A 11/2002

* cited by examiner

*Primary Examiner* — Sophia S Chen
(74) *Attorney, Agent, or Firm* — ScienBiziP, P.C.

(57) ABSTRACT

A driving force transmission mechanism is a mechanism for transmitting rotational force of the second rotor having a driving-side coupling to a first rotor having a driven-side coupling. The driving-side coupling includes a body and a plurality of second engaging members engaging with first engaging members of the driven-side coupling, each of the plurality of second engaging members has at an abutting point on an abutting surface of a corresponding first engaging member a first inclined surface inclined so as to be away from a rotation axis of the body from a downstream side toward an upstream side in a rotation direction of the body.

7 Claims, 13 Drawing Sheets

DRIVING FORCE TRANSMISSION MECHANISM AND IMAGE FORMING APPARATUS

BACKGROUND OF THE INVENTION

Field of the Invention

The present invention relates to a driving force transmission mechanism and an image forming apparatus, and in particular, to a driving force transmission mechanism, which transmits rotational force of a second rotor to a first rotor by fitting a driving-side coupling portion having the second rotor with a driven-side coupling portion having the first rotor, and an image forming apparatus including the same.

Description of the Background Art

One example of this type of a conventional image forming apparatus equipped with a driving force transmission mechanism is disclosed in Japanese Patent Laid-open Publication No. 2002-341658. In the technology disclosed in Japanese Patent Laid-open Publication No. 2002-341658, there are provided a driving protrusion at the tip (driving-side coupling portion) of a power transmission shaft (second rotor) on the apparatus body side, and a shaft coupling (first rotor) at the tip of a drive shaft of a developing roller. The shaft coupling has a second engaging portion (driven-side coupling portion) to be fitted with the driving-side coupling portion, and there are formed at the second engaging portion an engagement groove to accommodate the driving projection of the power transmission shaft and an inclined surface to guide the driving projection into the engagement groove.

When connecting the driving-side coupling portion and the driven-side coupling portion, a shaft center of the driving-side coupling portion does not always coincide with that of the driven-side coupling portion because they may be connected with the shaft centers thereof being misaligned due to dimensional errors of the parts. In particular, when multiple shafts need to be positioned at the same time, if positioning one shaft as a main shaft, the other shafts accompanied with it are likely to be misaligned in the shaft centers of the coupling portions.

In the technology disclosed in Japanese Patent Laid-open Publication No. 2002-341658, when the shaft center of the driving-side coupling portion (and thus the power transmission shaft on the apparatus body side) and the shaft center of the driven-side coupling portion (and thus the drive shaft of the developing roller) are misaligned, although rotational force of the power transmission shaft may be transmitted to the drive shaft of the developing roller, both shaft centers cannot be aligned (axially coincided) with each other. Therefore, the drive shaft of the developing roller can cause an uneven rotation (i.e., fluctuation in a rotational speed) due to the misalignment between both shaft centers.

In light of the foregoing, a main object of the present invention is to provide a novel driving force transmission mechanism and a novel image forming apparatus.

Another object of the present invention is to provide a driving force transmission mechanism capable of reducing the uneven rotation generated in a first rotor as a driven-side member, and an image forming apparatus including the same.

SUMMARY OF THE INVENTION

In the first aspect of the invention, a driving force transmission mechanism that transmits rotational force of a second rotor to a first rotor by fitting a driving-side coupling included in the second rotor into a driven-side coupling included in the first rotor is provided, wherein the driven-side coupling comprises: a cylindrical receiving member; and a plurality of first engaging members provided on an inner peripheral surface of the receiving member at predetermined intervals in a direction along a circumference of the receiving member and each having an abutting surface parallel to a surface including a rotation axis of the receiving member, the driving-side coupling comprises: a cylindrical or columnar body to be inserted into the receiving member; and a plurality of second engaging members provided on an outer peripheral surface of the body at predetermined intervals in a direction along a circumference of the body and engaging with the plurality of first engaging members; each of the plurality of second engaging members has at an abutting point on the abutting surface of a corresponding first engaging member a first inclined surface inclined so as to be away from a rotation axis of the body from a downstream side toward an upstream side in a rotation direction of the body.

According to the first aspect of the invention, even if the shaft center of the driven-side coupling and the shaft center of the driving-side coupling are misaligned, it is possible to reduce or prevent any uneven rotation generated in the first rotor since the driven-side coupling and the driving-side coupling are automatically aligned (axially coincided) with each other with the first inclined surface.

In the second aspect of the invention, the driving force transmission mechanism according to the first aspect is provided, wherein the body has on the outer peripheral surface between the plurality of second engaging members a second inclined surface that is inclined so as to approach the rotation axis of the body from a base side toward a tip side of the body.

In the third aspect of the invention, the driving force transmission mechanism according to the first or second aspect is provided, wherein the second rotor comprises: a rotating shaft whose base end is rotatably supported by a rotational shaft support; and a gear formed at the base end of the rotating shaft, the driving-side coupling is formed at a tip of the rotating shaft, and the second rotor is provided so that the driving-side coupling can precess with the base end of the rotating shaft serving as a fulcrum.

In the fourth aspect of the invention, the driving force transmission mechanism according to the third aspect further comprises a holder provided so as to cover the gear of the second rotor, wherein the gear has an angle regulator that regulates a precessing angle of the driving-side coupling by abutting to the holder.

In the fifth aspect of the invention, the driving force transmission mechanism according to any one of the first to the fourth aspects is provided, wherein each of the plurality of second engaging members has at a tip a third inclined surface that is inclined so as to approach a base side of the body from the downstream side toward the upstream side in the rotation direction of the body.

In the sixth aspect of the invention, an image forming apparatus comprising a driving force transmission mechanism according to any one of the first to the fifth aspects is provided.

In the seventh aspect of the invention, the image forming apparatus according to the sixth aspect comprises: an apparatus body; and a detachable device that can be attached to and detached from the apparatus body, wherein the first rotor is provided in the detachable device, and the second rotor is provided in the apparatus body.

In the eighth aspect of the invention, the image forming apparatus according to the seventh aspect is provided, wherein the detachable device has a positioning member with respect to the apparatus body at a position different from a position that the first rotor is provided at.

According to the present invention, even if the shaft center of the driven-side coupling and the shaft center of the driving-side coupling are misaligned, it is possible to reduce or prevent any uneven rotation generated in the first rotor since the driven-side coupling and the driving-side coupling are automatically aligned (axially coincided) with each other with the first inclined surface.

The above mentioned or other objects, features, and advantages of the present invention will be revealed by reading the following detailed description of embodiments with reference to the drawings.

DESCRIPTION OF THE PREFERRED EMBODIMENTS

First Embodiment

Figure 1:
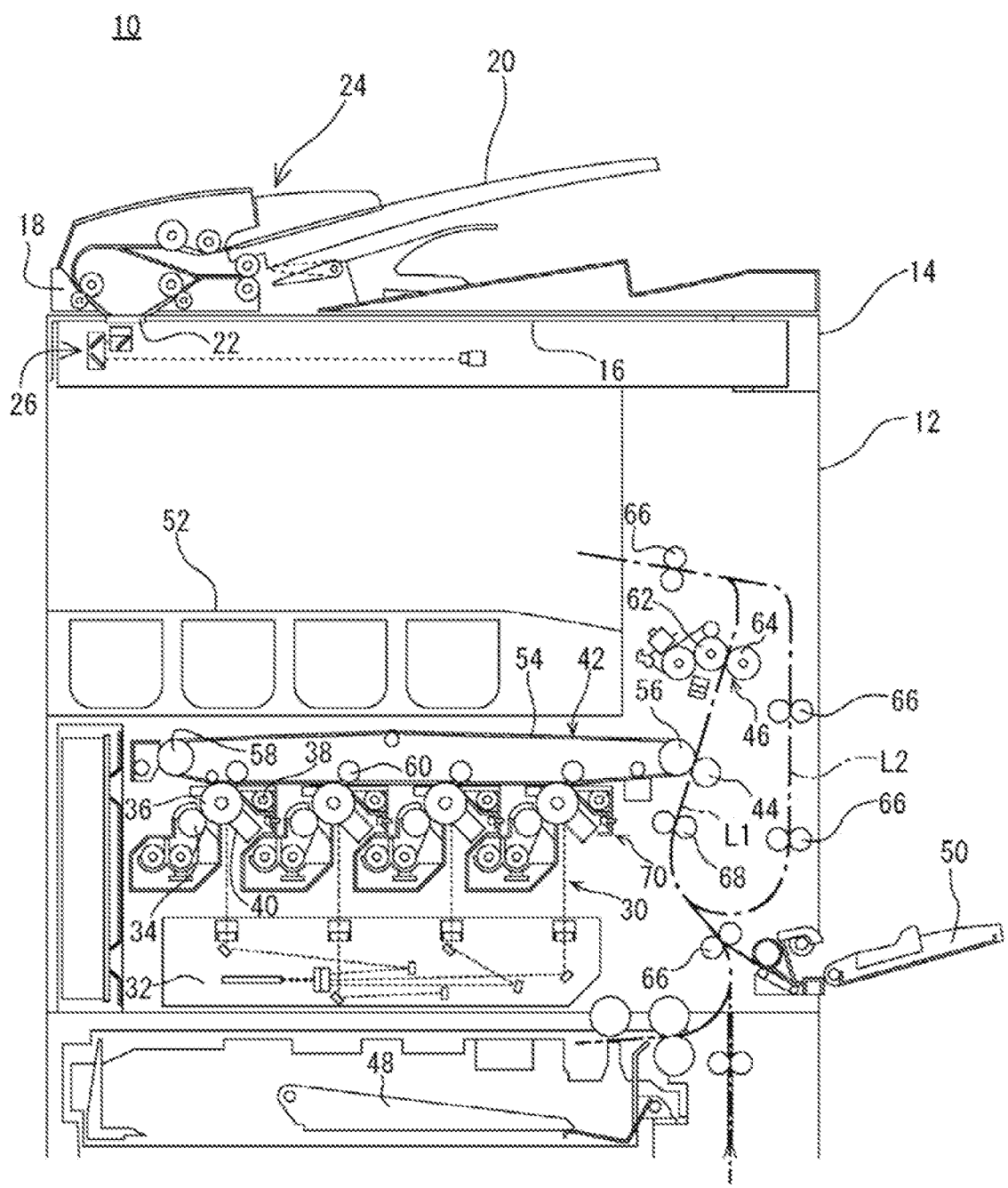
FIG. 1 is a schematically cross-sectional view illustrating an internal structure of an image forming apparatus according to a first embodiment of the present invention.
Figure 14:
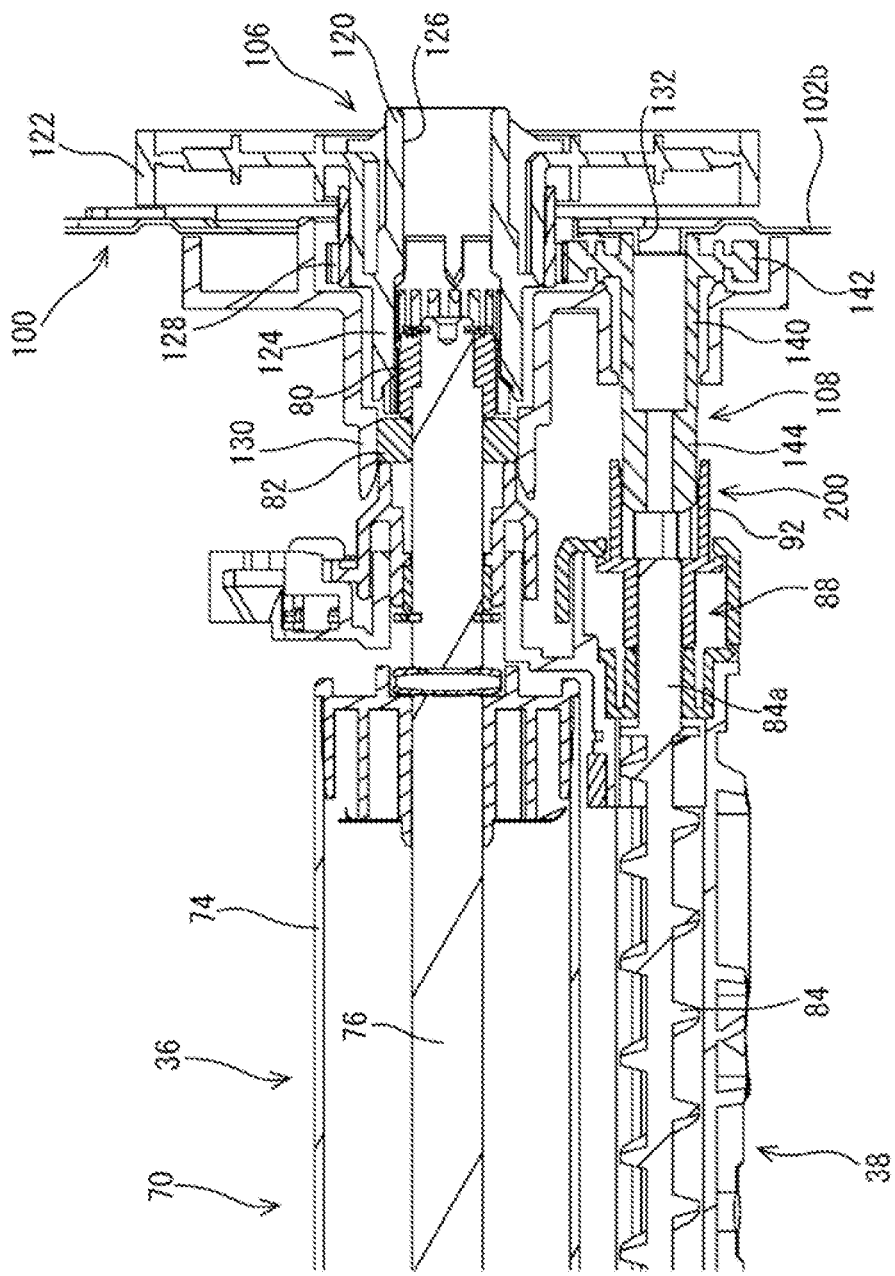
FIG. 14 is a cross-sectional view illustrating a structure in which the process unit is connected to the process unit driving device.

Referring to FIG. 1, an image forming apparatus 10 according to a first embodiment of the present invention is a multifunction peripheral (MFP) including a photocopying function, a printer function, a scanner function, a facsimile function, etc., and forms a multi-color image or a monochromatic image on a paper (i.e., a recording medium) by an electrophotographic method. The image forming apparatus 10 includes a driving force transmission mechanism 200 (see FIG. 14) configured by a screw coupling 88 as an example of a first rotor, and a screw driving gear 108 as an example of a second rotor, and transmits through the driving force transmission mechanism 200 driving force from a process unit driving device 100 (see FIG. 7) to a delivering screw 84 of a cleaner unit 38, which is described in more detail below.

First, the basic configuration of the image forming apparatus 10 is described briefly. Meanwhile, it should be noted that in the first embodiment, a front-back direction (i.e., depth direction) of the image forming apparatus 10 and components thereof is defined as a side facing a standing position of a user who operates the image forming apparatus 10, that is, a side to which an operation panel 28 is disposed is front (front side). Furthermore, a left-right direction (i.e., transverse direction) of the image forming apparatus 10 and components thereof is defined as a reference when viewing the image forming apparatus 10 from the front side.

Figure 2:
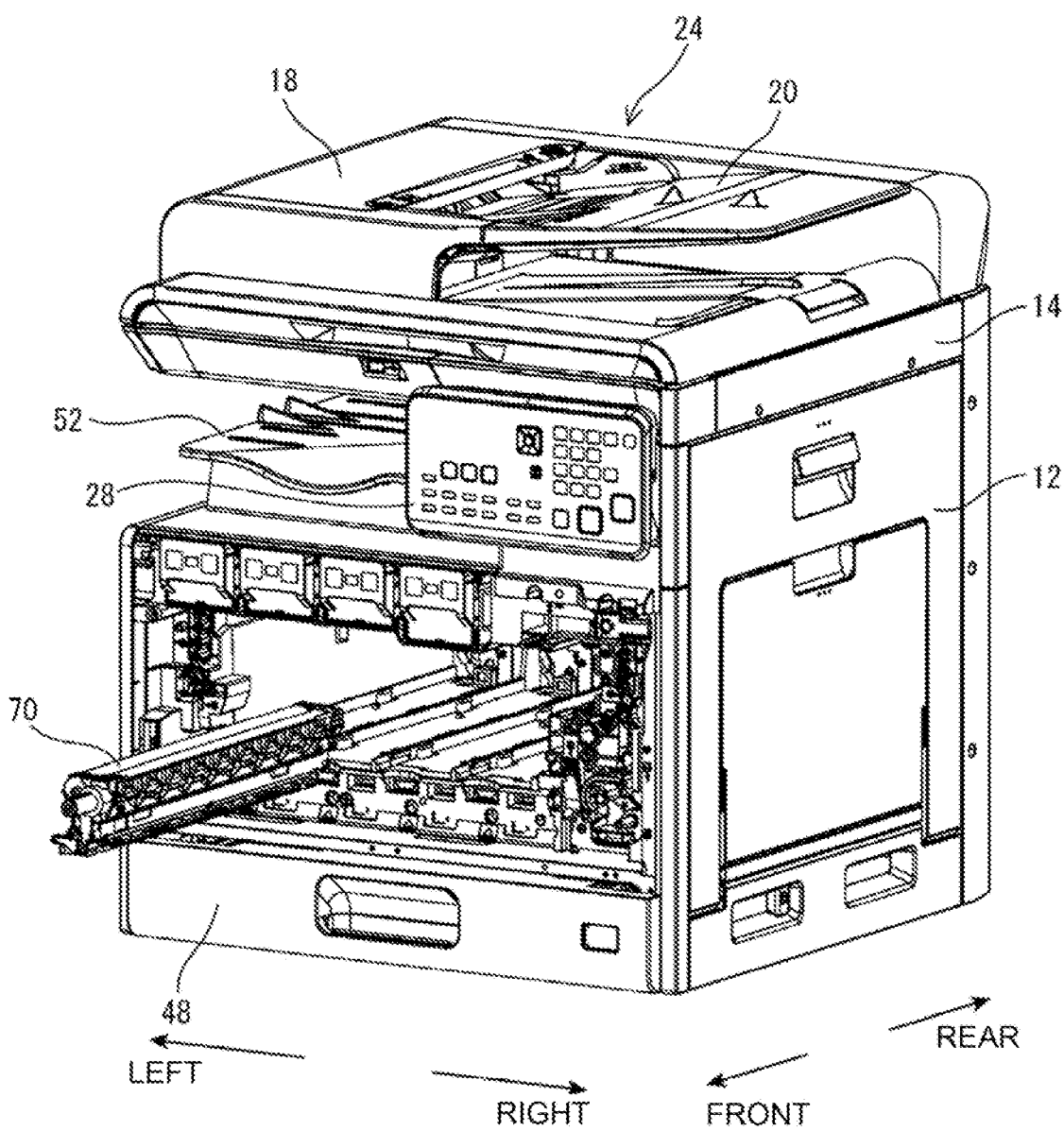
FIG. 2 is a diagram illustrating how to install a process unit on the apparatus body.

As shown in FIGS. 1 and 2, the image forming apparatus 10 includes an apparatus body 12 having an image forming unit 30 and the like, and an image reading device 14 disposed on the upper side thereof.

The image reading device 14 includes a document laying table 16 made of a transparent material. A document pressing cover 18 is attached on the document laying table 16 with a hinge or the like so as to be freely openable/closable. The document pressing cover 18 is provided with an auto document feeder (ADF) 24 which automatically feeds documents laid on a document stacking tray 20 one by one to an image reading position 22. The operation panel 28 to receive an input such as a print instruction from a user is disposed on the front side of the document laying table 16. The operation panel 28 is appropriately provided with a display, operation buttons and the like.

Furthermore, the image reading device 14 incorporates an image reader 26 which includes a light source, a plurality of mirrors, an imaging lens, a line sensor, etc. The image reader 26 exposes a surface of a document to the light source, and leads a reflected light reflected from the surface of the document to the imaging lens with the plurality of mirrors. Then, the reflected light is imaged on a light receiving element of the line sensor by the imaging lens. The line sensor detects luminance or chromaticity of the reflected light imaged on the light receiving element, and generates image data based on an image depicted on the surface of the document. As the line sensor, a CCD (Charge Coupled Device) or a CIS (Contact Image Sensor) or the like can be used.

The apparatus body 12 accommodates a controller (not shown) which includes a CPU, a memory and the like, and the image forming unit 30, etc. The controller transmits control signals to each part of the image forming apparatus 10 in response to operation instructions input from the operation panel 28, and causes the image forming apparatus 10 to perform various operations.

The image forming unit 30 is provided with an exposure unit 32, a developer 34, a photoreceptor drum 36, the cleaner unit 38, a charger 40, an intermediate transfer belt unit 42, a transfer roller 44, and a fusing unit 46, etc. The image forming unit 30 forms an image on a paper transported from a paper feeding tray 48 or a manually feeding tray 50 and discharges an image-formed paper into a paper discharge tray 52. The image data, which are read by the image reader 26, transmitted from an external computer or the like, are used as the image data for forming the image on the paper.

The image data handled by the image forming apparatus 10 correspond to a color image using four colors consisting of black (K), cyan (C), magenta (M), and yellow (Y). Therefore, the developer 34, the photoreceptor drum 36, the cleaner unit 38 and the charger 40 are provided four each so that four types of latent images corresponding to four colors are formed, whereby these constitute four image stations. In addition, the photoreceptor drum 36, the cleaner unit 38, and the charger 40 are unitized to constitute a process unit 70 as an example of a detachable device. Namely, the image forming unit 30 is provided with four process units 70 each having the photoreceptor drum 36, the cleaner unit 38, the charger 40, etc. Each of the process units 70 is separately detachable to/from the front side of the apparatus body 12.

Furthermore, there is fixedly provided a process unit driving device 100 on the rear side of the apparatus body 12. Upon the process unit 70 is installed on the apparatus body 12, the process unit 70 is connected to the process unit driving device 100, and each of photoreceptor drums 36, delivering screws 84 and the like is rotationally driven by rotational driving force generated in the process unit driving device 100. Specific configurations of the process unit 70 and the process unit driving device 100 will be described later.

The photoreceptor drum 36 is an image carrier in which a photosensitive layer is formed on a surface of a cylindrical base 74 having conductivity, and the charger 40 is a member to charge the surface of the photoreceptor drum 36 to a predetermined potential. The exposure unit 32 is configured as a laser scanning unit (LSU) having a laser emitting unit, a reflection mirror, and the like, and forms an electrostatic latent image in accordance with the image data on the surface of the photoreceptor drum 36 by exposing the surface of the charged photoreceptor drum 36. The developer 34 visualizes the electrostatic latent image formed on the photoreceptor drum 36 with toners of four colors (i.e., Y, M, C, and K). The cleaner unit 38, which is provided with a cleaning blade (not shown) and a delivering screw 84, and the like, removes a foreign substance such as toner remaining on the surface of the photoreceptor drum 36 after a development process and an image transfer process are finished, and delivers it to a waste toner box (not shown).

The intermediate transfer belt unit 42 is provided with an intermediate transfer belt 54, a driving roller 56, a driven roller 58, four intermediate transfer rollers 60, etc. and disposed on the photoreceptor drums 36. The intermediate transfer belt 54 is provided so as to contact every photoreceptor drum 36. The toner images of each color formed on each photoconductor drum 36 are sequentially transferred onto the intermediate transfer belt 54, so that a multicolor toner image is formed on the intermediate transfer belt 54. The transfer roller 44 is disposed in the vicinity of the driving roller 56. The multi-color toner image formed on the intermediate transfer belt 54 is transferred to a paper as it passes through a nip area between the intermediate transfer belt 54 and the transfer roller 44.

The fusing unit 46, which is provided with a heating roller 62 and a pressure roller 64, is disposed above the transfer roller 44. The heating roller 62 is set to be a predetermined fusing temperature, and as the paper passes through the nip area between the heating roller 62 and the pressure roller 64, the toner image transferred to the paper is melted, mixed, and pressed, so that the toner image is thermally fused to the paper.

Inside the apparatus body 12, there is formed a first paper transport path L1 for transporting the paper from the paper feeding tray 48 or the manually feeding tray 50 to the paper discharge tray 52 via a resist roller 68, the transfer roller 44, and the fusing unit 46. Furthermore, there is formed a second paper transport path L2 for returning the paper passing through the fusing unit 46 after a simplex printing of the paper is finished to the first paper transport path L1 at the upstream side of the transfer roller 44 in a paper transporting direction in order to perform a duplex printing on the paper. In the first paper transport path L1 and the second paper transport path L2, there are provided a plurality of transport rollers 66 to provide an auxiliary propulsion to the paper as appropriate.

In case of performing a simplex printing (image formation) in the apparatus body 12, the paper is led one by one from the paper feeding tray 48 or the manually feeding tray 50 into the first paper transport path L1, and then transported to the resist roller 68 with the transport rollers 66. The resist roller 68 transports the paper to the transfer roller 44 at a timing when a tip of the paper and a tip of the image information on the intermediate transfer belt 54 are aligned with each other, and the toner image is transferred on the paper. Then, an unfused toner on the paper is thermally melted and fused by passing through the fusing unit 46, and the paper is discharged onto the paper discharge tray 52 thereafter.

On the other hand, in case of performing a duplex printing, when a trailing edge of the paper passing through the fusing unit 46 after the simplex printing of the paper is finished reaches the transport roller 66 nearby the paper discharge tray 52, the paper reversely travels and is led to the second paper transport path L2 by reversely rotating the transport roller 66. The paper led to the second paper transport path L2 is transported through the second paper transport path L2, and then led to the first paper transport path L1 at the upstream side of the resist roller 68 in the paper transporting direction. At this time, since the front and back surfaces of the paper are inverted, a printing process is performed on the back side of the paper as the paper passes through the transfer roller 44 and the fusing unit 46.

Figure 3:
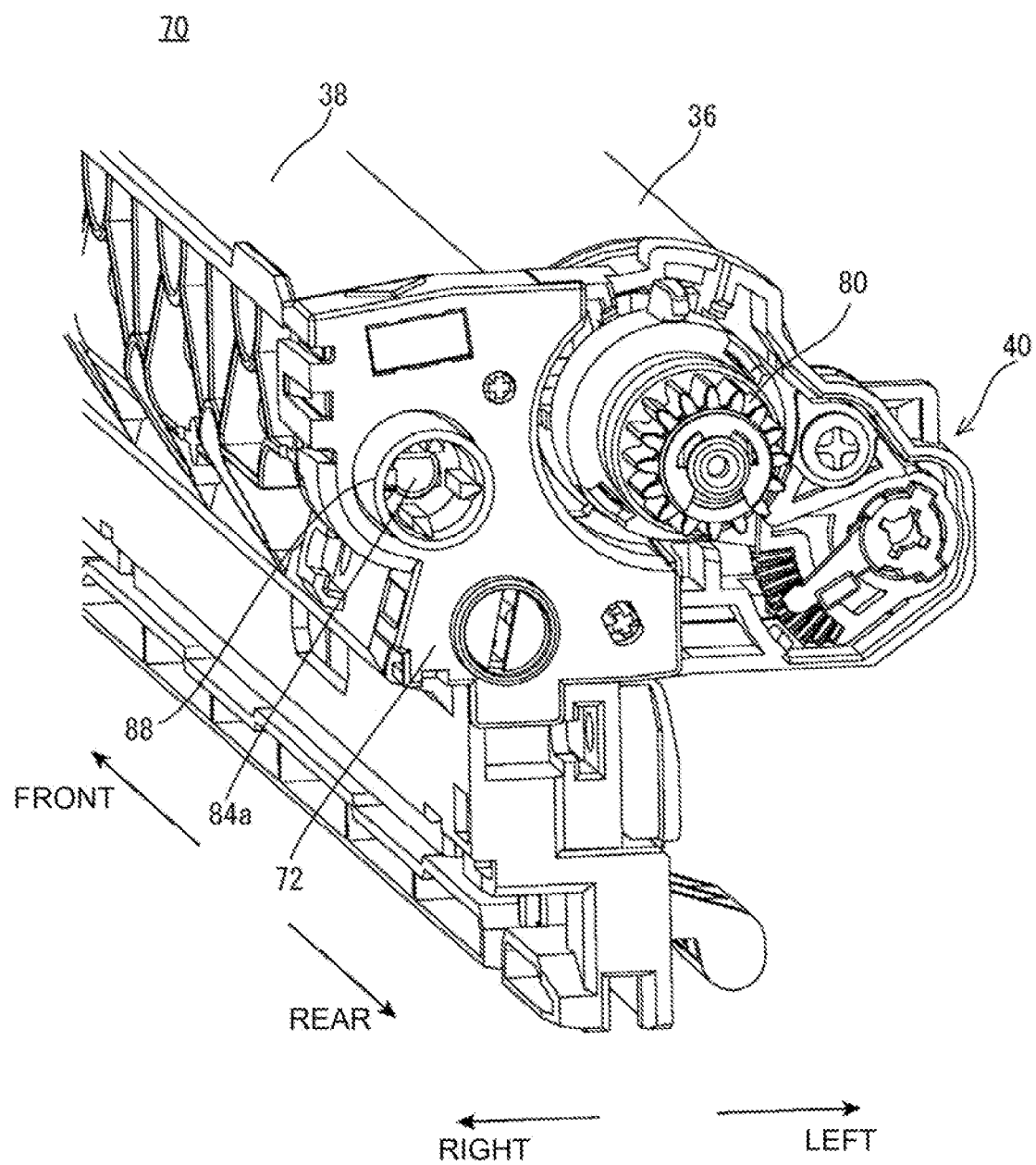
FIG. 3 is a perspective view illustrating a rear end portion of the process unit.
Figure 4:
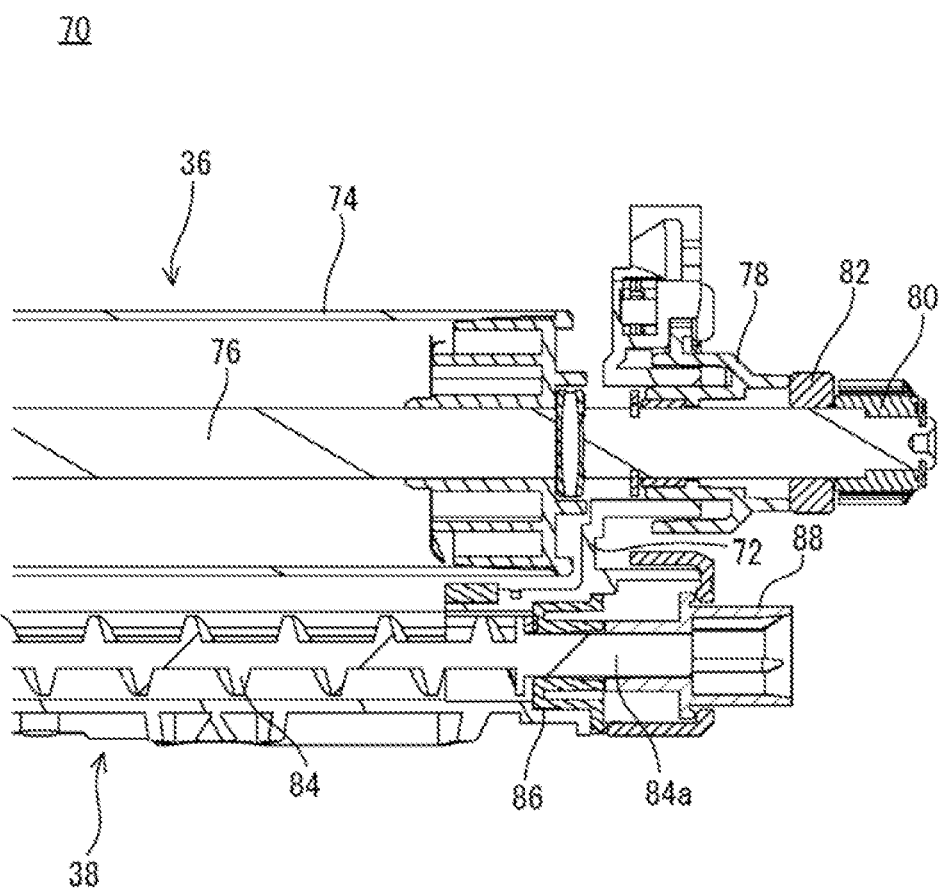
FIG. 4 is a cross-sectional view illustrating a rear end portion of the process unit.

Next, the configuration of the process unit 70 is described with reference to FIGS. 2 through 4. As shown in FIGS. 2 through 4, the process unit 70 is provided with the photoreceptor drum 36, the cleaner unit 38, the charger 40, etc., which are integrally held by a process unit frame 72 in a predetermined arrangement manner. The process unit 70 is detachable in the front direction of the apparatus body 12 and can be attached to or detached from the apparatus body 12 by sliding into or out of the apparatus body 12 in the depth direction (front-rear direction) of the apparatus body 12.

The photoreceptor drum 36 has a cylindrical base 74 on a surface of which a photosensitive layer is formed, and a metal drum shaft 76 which is provided so as to go through an axial center position of the base 74. Both end portions of the drum shaft 76 are rotatably supported by first bearings 78 provided in the process unit frame 72, and the base 74 rotates along with the rotation of the drum shaft 76.

A photoreceptor coupling 80 having external teeth is provided at the rear end portion of the drum shaft 76. The photoreceptor coupling 80 is detachably mated (connected) with a drive coupling 124 which is included in a drum driving gear 106 of the process unit driving device 100 described in detail below, and transmits rotational driving force of the drum driving gear 106 to the photoreceptor drum 36. Furthermore, in the rear end portion of the drum shaft 76 the second bearing 82 is provided between the first bearing 78 and the photoreceptor coupling 80. When the process unit 70 is installed on the apparatus body 12, the second bearing 82 is fitted into a drum positioning portion 130 formed in a support holder 110 of the process unit driving device 100 described below to allow for the positioning of the process unit 70 (i.e., centering of the photoreceptor drum 36) together with the drum positioning portion 130.

The cleaner unit 38 includes a cleaning blade and the delivering screw 84 which delivers to a waste toner box the foreign substance removed from the surface of the photoreceptor drum 36 by the cleaning blade. Both end portions of a screw shaft 84a of the delivering screw 84 are rotatably supported by third bearings 86 provided in the process unit frame 72. The screw coupling 88 is provided at the rear end portion of the screw shaft 84a. The screw coupling 88 and the screw driving gear 108 described below constitute the driving force transmission mechanism 200.

Figure 5:
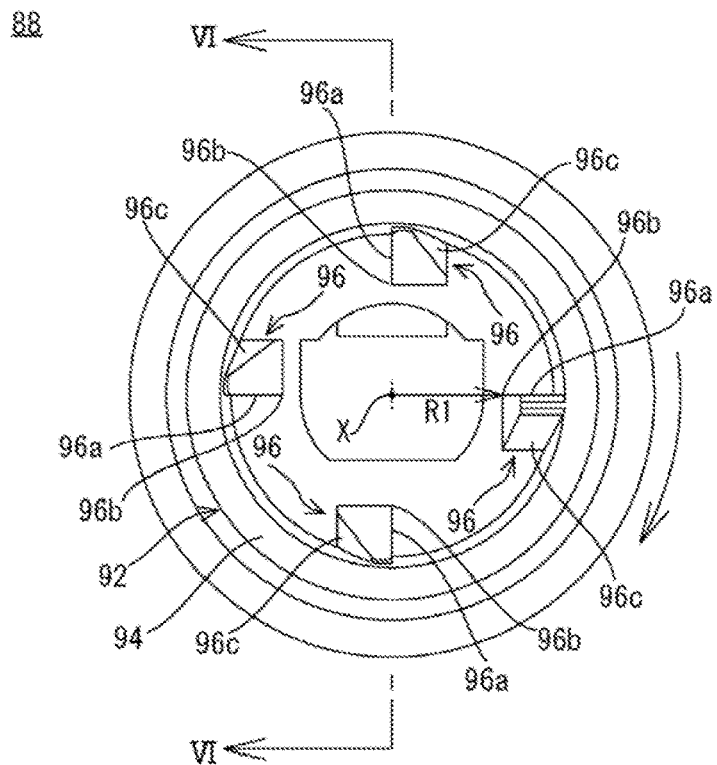
FIG. 5 is a rear view illustrating a screw coupling (first rotor) included in the process unit.
Figure 6:
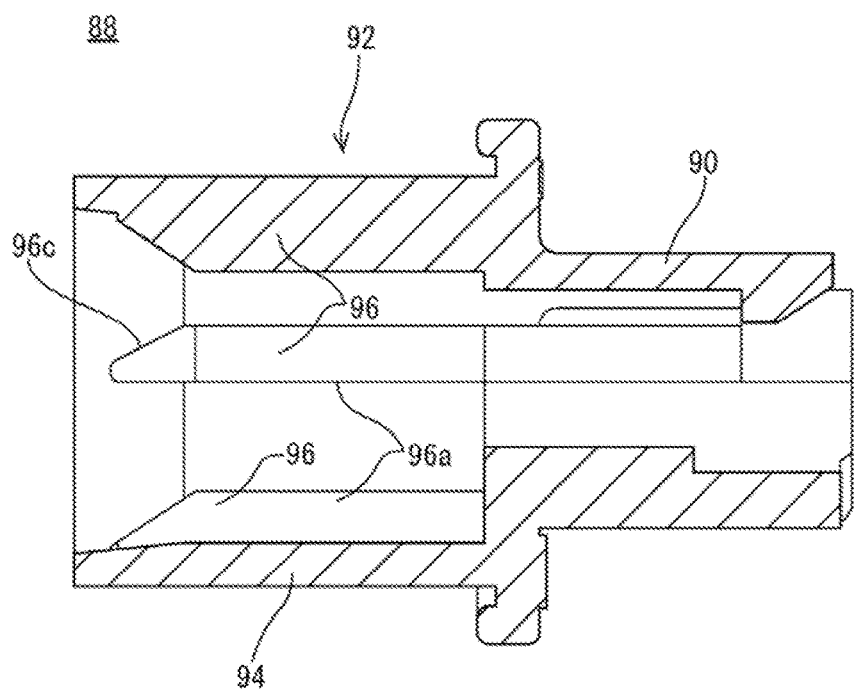
FIG. 6 is a cross-sectional view taken along line VI-VI of FIG. 5 illustrating a cross section of the screw coupling.

As shown in FIGS. 5 and 6, the screw coupling 88, which is an example of a first rotor, has a screw shaft fitting portion 90 provided on one end side (front end side) of the screw coupling 88 and a driven-side coupling 92 provided on the other end side (rear end side) of the screw coupling 88. The screw coupling 88 is coaxially and non-rotatably fitted to the screw shaft 84a by capping the rear end portion of the screw shaft 84a with the screw shaft fitting portion 90.

Furthermore, the driven-side coupling 92 is detachably mated (connected) with a driving-side coupling 144 of the screw driving gear 108 included in the process unit driving device 100 to transmit rotational driving force of the screw driving gear 108 to the screw coupling 88 and the delivering screw 84.

Specifically, the driven-side coupling 92 has a cylindrical receiving member 94. A plurality of first engaging members 96, which are protrusions provided at predetermined intervals in a direction along an inner circumference of the receiving member 94 and extend in an axial direction thereof, are formed on the inner peripheral surface of the receiving member 94. The number of the first engaging members 96 is preferably from three to six, for example. In this first embodiment, four first engaging members 96 are arranged on the inner peripheral surface of the receiving member 94 at an angular interval of 90°. Abutting surfaces 96a of the first engaging members 96 (i.e., surfaces abutting on a second engaging member 148 of the driving-side coupling 144 on the upstream side in a rotation direction) are formed so as to be parallel to a plane including a rotation axis X of the receiving member 94 (i.e., the rotation axis of the screw coupling 88), that is, orthogonal to the rotation direction of the receiving member 94. A distance R1, which is a radial distance from the rotation axis X of the receiving member 94 to an inner edge 96b of the abutting surface 96a, is 3.0 mm, for example. In other words, a diameter of a virtual circle connecting the inner edges 96b of abutting surfaces 96a becomes 6.0 mm.

In addition, a portion near the tip of each of first engaging members 96 is formed in a taper-like shape by at least an inclined surface 96c which is gradually inclined from an upstream side to a downstream side in the rotation direction of the receiving member 94 toward an edge portion of the receiving member 94. When the driven-side coupling 92 and the driving-side coupling 144 are fitted together, the inclined surfaces 96c can guide the second engaging members 148 of the driving-side coupling 144 into groove portions formed between the first engaging members 96.

Figure 7:
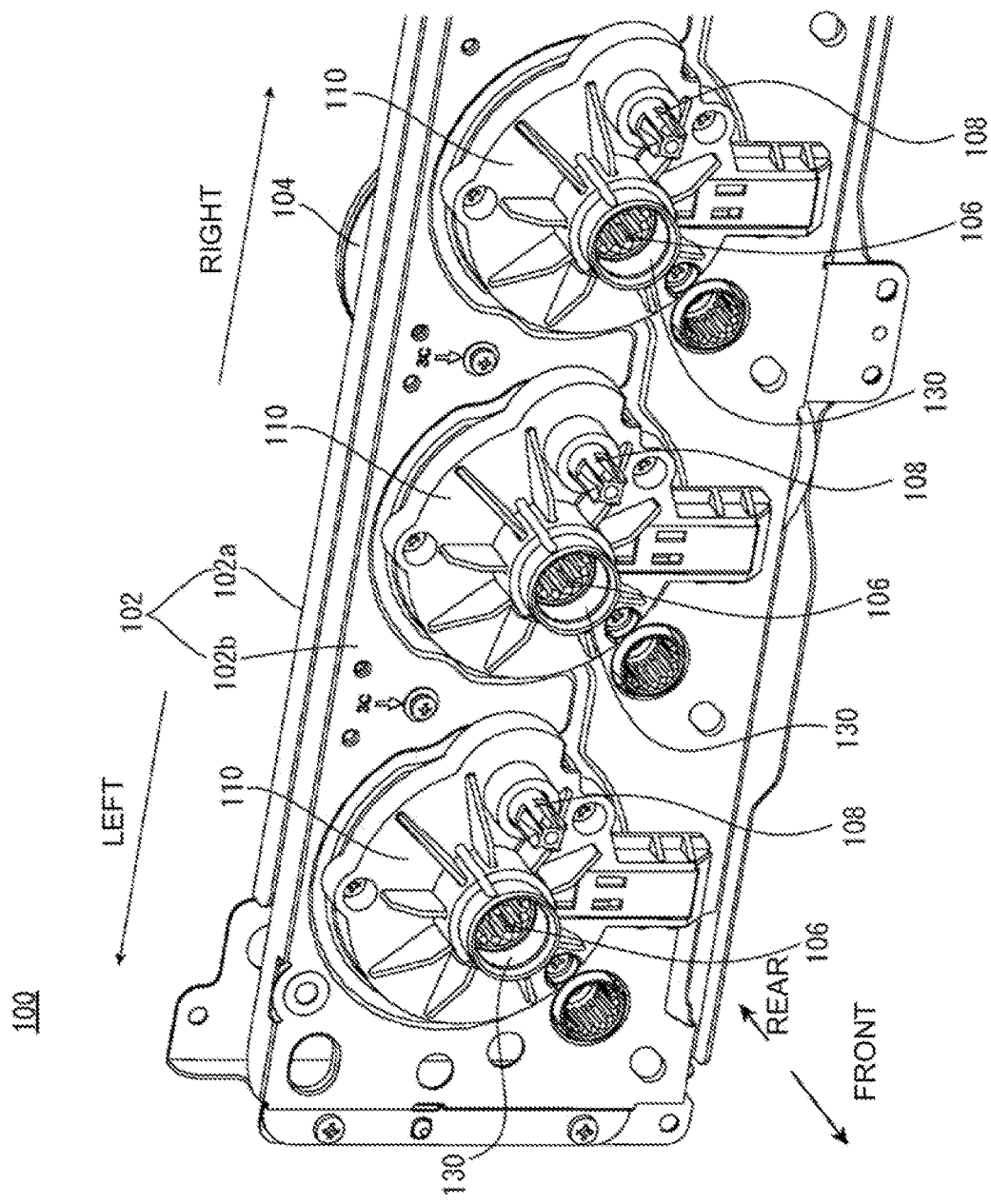
FIG. 7 is a perspective view illustrating a process unit driving device included in the apparatus body.
Figure 8:
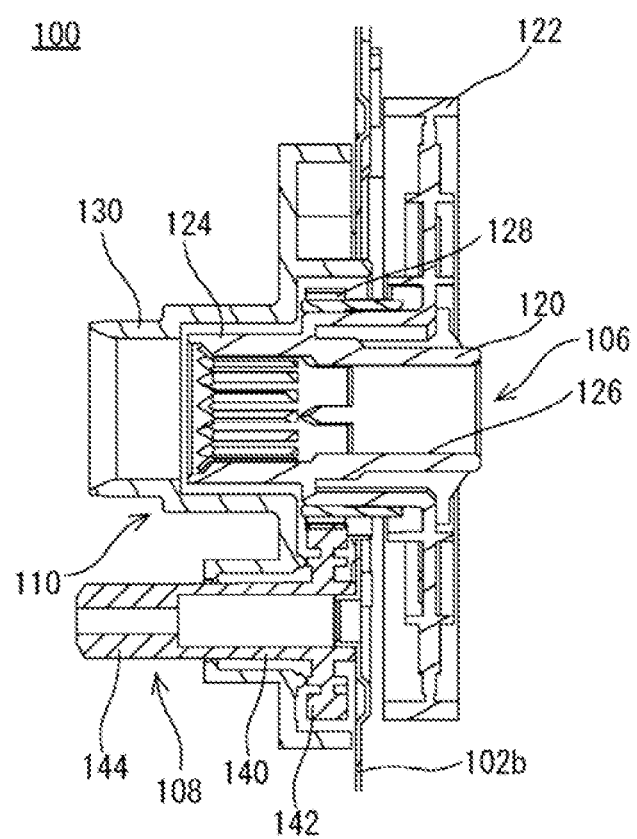
FIG. 8 is a cross-sectional view illustrating the process unit driving device.
Figure 9:
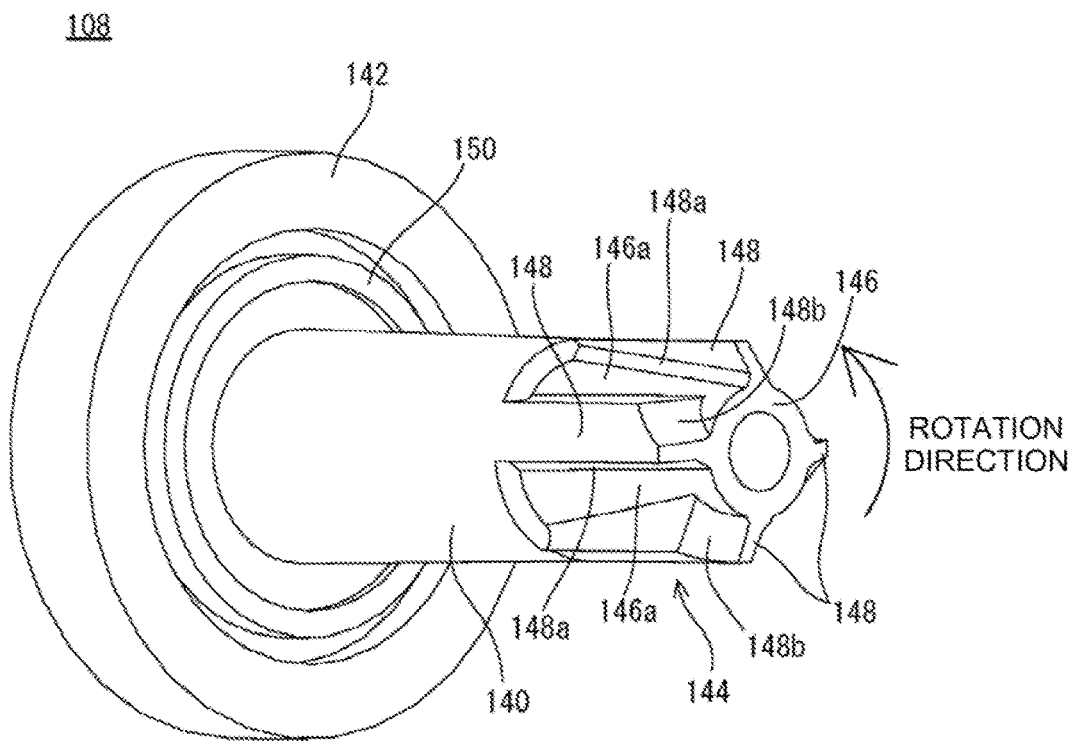
FIG. 9 is a perspective view illustrating a screw driving gear (second rotor)
Figure 10:
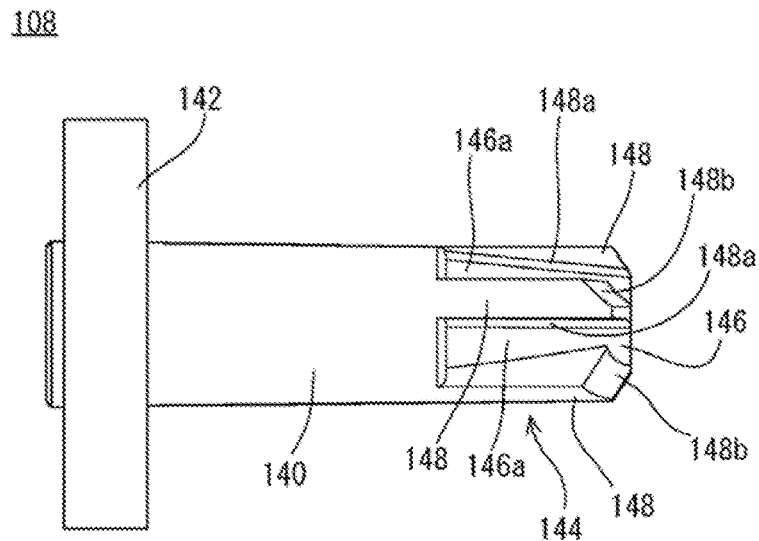
FIG. 10 is a side view of the screw driving gear.
Figure 11:
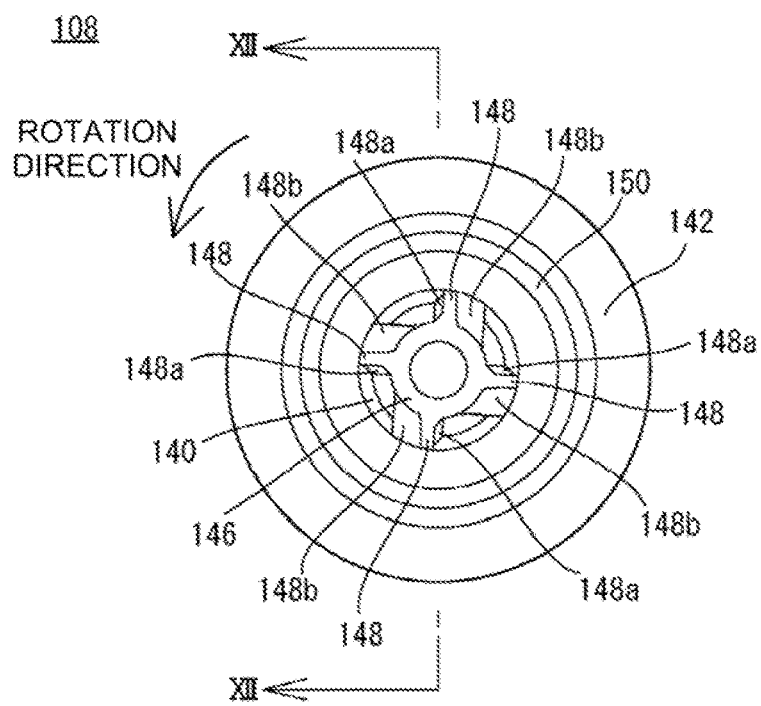
FIG. 11 is a front view of the screw driving gear.
Figure 12:
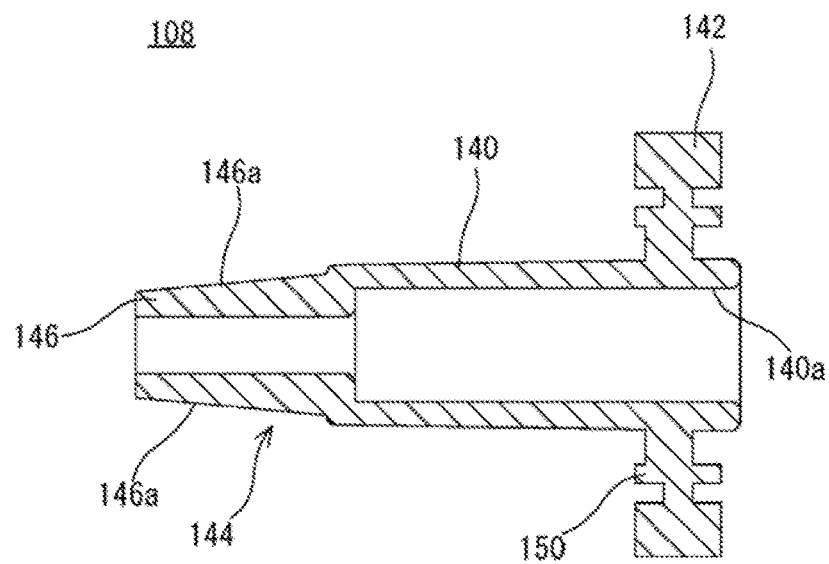
FIG. 12 is a cross-sectional view taken along line XII-XII of FIG. 11 illustrating a cross section of the screw driving gear.

Next, the configuration of the process unit driving device 100 is described with reference to FIGS. 7 and 8. As shown in FIGS. 7 and 8, the process unit driving device 100 is provided with a driving device frame 102, a driving motor 104, the drum driving gear 106, the screw driving gear 108, a support holder 110, etc. The process unit driving device 100 is fixedly provided on a rear side wall of the apparatus body 12, and applies rotational driving force to the photoreceptor drums 36 and the delivering screw 84. To this end, the drum driving gear 106, the screw driving gear 108, and the support holder 110 are provided four each so as to correspond to the four process units 70, and are held by the driving device frame 102 in a predetermined arrangement manner. It should be noted that three of them are shown in FIG. 7 for the convenience of explanation.

The driving device frame 102 is made of metal, for example, and includes an outside plate 102a disposed on the rear side and an inside plate 102b disposed on the front side with being spaced at a predetermined distance apart from the outside plate 102a. The driving motor 104 is provided on a back surface of the outside plate 102a. A motor shaft of the driving motor 104 is provided so as to penetrate the outside plate 102a toward the front side. In addition, there is provided on the outside plate 102a a gear support shaft (not shown) which rotatably supports the drum driving gear 106.

Furthermore, the drum driving gear 106 includes a boss portion 120, a first gear portion 122, a drive coupling 124, etc., which are integrally molded by synthetic resin. The boss portion 120 is formed in a substantially cylindrical shape, and at a base (rear side) end portion thereof a first gear portion 122 is formed in a disk shape. In addition, the drive coupling 124 having internal teeth is formed at the tip (front side end) portion of the boss portion 120. Namely, there is integrally formed the drive coupling 124 at the tip portion of the drum driving gear 106. As mentioned above, the drive coupling 124 is detachably mated with the photoreceptor coupling 80 which is attached to the drum shaft 76 of the photoreceptor drum 36, as described above. Furthermore, there is provided a shaft hole 126 in the boss portion 120 of the drum driving gear 106, which opens toward the rear side. By inserting the gear support shaft provided on the outside plate 102a into the shaft hole 126, the gear support shaft can rotatably support the drum driving gear 106.

A gear train, which includes the first gear portion 122 of the drum driving gear 106, an idle gear (not shown) and the like, is accommodated between the outside plate 102a and the inside plate 102b. Rotational driving force generated by the driving motor 104 is transmitted from the motor shaft to the drum driving gear 106 via appropriate idle gears, and then transmitted from the drum driving gear 106 to the drum shaft 76 of the photoreceptor drum 36 via the couplings (i.e., the drive coupling 124 and the photoreceptor coupling 80).

Furthermore, on an outer peripheral surface of the boss portion 120 of the drum driving gear 106, there is provided a second gear portion 128 on the front side from the inside plate 102b. The second gear portion 128 is meshed with a gear 142 of the screw driving gear 108, whereby rotational driving force of the drum driving gear 106 can be transmitted to the screw driving gear 108. Namely, rotational driving force generated by the driving motor 104 can be also transmitted from the drum driving gear 106 to the screw driving gear 108. The screw driving gear 108 is a member for transmitting rotational driving force generated by the driving motor 104 to the delivering screw 84, and is provided with a rotating shaft 140, the gear 142, and the driving-side coupling 144. The specific configuration and support structure of the screw driving gear 108 are described below.

Furthermore, the support holder 110 is fixed to the inside plate 102b so as to cover the drum driving gear 106 protruding from the inside plate 102b and the screw driving gear 108 excepting for the tip portion thereof (i.e., the driving-side coupling 144). The support holder 110 is a holding member made of synthetic resin for positioning the process unit 70 relative to the apparatus body 12, and has the cylindrical drum positioning portion 130 concentric with the drum driving gear 106. At the drum positioning portion 130 the support holder 110 rotatably supports the rear side end portion of the drum shaft 76 of the photoreceptor drum 36 via the second bearing 82 (see FIG. 14). Thereby, the photoreceptor drum 36 (and thus consequently the entire process unit 70) can be positioned, so that the drum driving gear 106 and the drum shaft 76 of the photoreceptor drum 36 are axially aligned accurately. Therefore, the rotation of the drum driving gear 106 can be smoothly transmitted to the drum shaft 76, so that it is possible to rotate the photoreceptor drum 36 with high accuracy.

On the other hand, the screw coupling 88 and the screw driving gear 108 are connected at a position spaced apart from the second bearing 82, which is a positioning member for positioning the process unit 70 with respect to the apparatus body 12, and the drum positioning portion 130. Namely, at a position different from a position where the screw coupling 88 is provided, the process unit 70 has the second bearing 82 which is the positioning member with respect to the apparatus body 12. In this regard, it is difficult to match the axial center of the screw coupling 88 with the axial center of the screw driving gear 108 since there are manufacturing errors (dimensional tolerances) such as processing errors and assembly errors, so that misalignment between the axial centers of both couplings (the driven-side coupling 92 and the driving-side coupling 144) is likely to occur.

In this first embodiment accordingly, by forming the first inclined surface 148a on the screw driving gear 108, the driven-side coupling 92 and the driving-side coupling 144 are axially aligned (centered) automatically along with the rotation of the screw driving gear 108 even when the driven-side coupling 92 and the driving-side coupling 144 are connected with the axial centers thereof being misaligned. A specific explanation is provided as follows.

As shown in FIGS. 9 to 12, the screw driving gear 108, which is an example of a second rotor, is a member to transmit rotational driving force to the screw coupling 88 (and thus to the delivering screw 84). The screw driving gear 108 is provided with the rotating shaft 140, the gear 142, and the driving-side coupling 144, which are integrally molded by synthetic resin.

The rotating shaft 140 is formed in a substantially cylindrical shape, and a disk-shaped gear 142 is formed at the base (rear side) end thereof. External teeth not shown in the drawings are formed on the outer peripheral surface of the gear 142. In addition, a driving-side coupling 144 is formed at the tip (front side end) portion of the rotating shaft 140. Namely, the driving-side coupling 144 is integrally formed at the tip portion of the rotating shaft 140. As mentioned above, the driving-side coupling 144 is detachably mated with the screw coupling 88 attached to the screw shaft 84a of the delivering screw 84.

The driving-side coupling 144 has a cylindrical body 146 to be inserted into the receiving member 94 of the driven-side coupling 92. Alternatively, the body 146 may be formed in a cylindrical shape. On the outer peripheral surface of the body 146 there are formed a plurality of second engaging members 148 which engage the first engaging members 96 included in the driven-side coupling 92. The second engaging members 148 are protrusions which extend along the axial direction of the body 146 and are provided at predetermined intervals along the circumference of the inner peripheral surface of the body 146. The number of the second engaging members 148 is preferably from three to six, for example. In this first embodiment, four second engaging members 148 are arranged on the outer peripheral surface of the body 146 at an angular interval of 90°. The number of the second engaging members 148 may be less than the number of the first engaging members 96.

There is formed a first inclined surface 148a at the root portion of a surface which is on the downstream side in the rotation direction of the body 146 in each of the plurality of second engaging member 148, that is, at a portion corresponding to the abutting surface 96a of first engaging member 96 (specifically, the inner edge 96b). The first inclined surface 148a is linearly inclined so as to be gradually away from the rotation axis of the body 146 (i.e., a diameter of the outer peripheral surface become larger) from the downstream side toward the upstream side in the rotation direction of the body 146. The inclination angle of the first inclined surface 148a with respect to the tangential direction of the body 146 is set to from 30° to 60°, for example, and in this first embodiment it is set at 45°.

In addition, the body 146 has a tapered shape in which the diameter gradually decreases from the base end (rear side end) toward the tip end (front side end). Namely, the body 146 has a second inclined surface 146a between the second engaging members 148, which is inclined so as to gradually approach the rotation axis of the body 146 (i.e., the diameter of the outer peripheral surface becomes smaller) from the base side toward the tip side. The first inclined surface 148a is further formed so as to be inclined along the second inclined surface 146a.

An outer diameter of the base of the body 146 is 7 mm and the outer diameter of the tip portion of the body 146 is 5 mm, for example. The maximum diameter of a circle connecting the rear side ends of the first inclined surfaces 148a (i.e., the diameter of a circle connecting upper side edges of the first inclined surfaces 148a on the upstream side in the rotation direction) is 8 mm, and the maximum diameter of a circle connecting the front side ends of the first inclined surfaces 148a is 6 mm, for example. Here, when the driven-side coupling 92 and the driving-side coupling 144 are fitted together, the tip portion of the driven-side coupling 92 is located at a middle portion of the body 146 in an axial direction the driving-side coupling 144 (see FIG. 14). Accordingly, the inner edge 96b of the abutting surface 96a of the first engaging member 96 included in the driven-side coupling 92 is located on a radially outside position from the outer peripheral surface of the body 146 of the driving-side coupling 144 and on a radially inside position from the upper side edge of the first inclined surface 148a of the second engaging member 148 on the upstream side in the rotation direction. Then, the inner edge 96b of the first engaging member 96 is in contact with the first inclined surface 148a of the second engaging member 148 in a point contact manner.

Furthermore, in the tip portion of each of the plurality of second engaging members 148 there is formed a third inclined surface 148b which is gradually inclined so as to approach the base of the body 146 from the downstream side toward the upstream side in the rotation direction of the body 146. When the driven-side coupling 92 and the driving-side coupling 144 are fitted together, the third inclined surfaces 148b can guide the second engaging members 148 of the driving-side coupling 144 into groove portions formed between the first engaging members 96.

Figure 13:
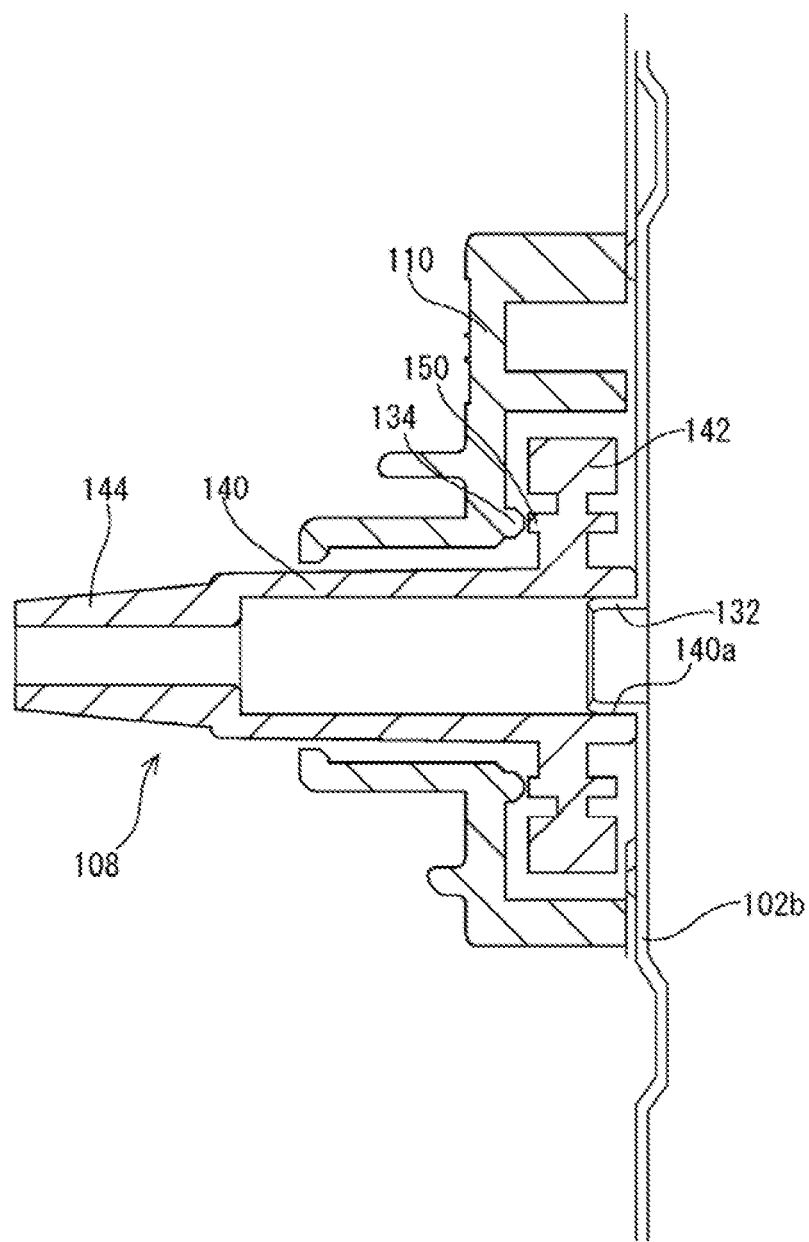
FIG. 13 is a partially enlarged cross-sectional view illustrating a portion around the screw driving gear of the process unit driving device.

Furthermore, in the rotating shaft 140 of the screw driving gear 108 there is formed a shaft cavity 140*a* which is a cylindrical space opening toward the rear side. As shown in FIGS. 8 and 13, in the inside plate 102*b* of the driving device frame 102 there is provided a short cylindrical rotation shaft support 132 projecting toward the front side, and the screw driving gear 108 is rotatably supported with the rotation shaft support 132 by inserting the rotation shaft support 132 into the shaft cavity 140*a*.

Here, an inner diameter of the shaft cavity 140*a* is set to be slightly bigger than an outer diameter of the rotation shaft support 132, so that the rotation shaft support 132 is in slide contact with the shaft cavity 140*a* of the screw driving gear 108 with a slight clearance therebetween being in a radial direction of the rotation shaft support 132. Furthermore, a length of the rotation shaft support 132 is set to be short in the axial direction, so that a mere base of the rotation shaft support 132 can be in slide contact with the screw driving gear 108. The length of the rotation shaft support 132 in the axial direction, that is, the axial length of a portion in which the rotation shaft support 132 is in slide contact with the shaft cavity 140*a* is set to from 3 mm to 8 mm, for example.

In this way, by reducing the axial length of the portion in which the rotation shaft support 132 is in slide contact with the shaft cavity 140*a* of the screw driving gear 108, it is possible to swing (tilt) the screw driving gear 108 with respect to the rotation shaft support 132 while securing the rotational accuracy of the screw driving gear 108. Namely, the screw driving gear 108 is provided so that the tip portion (i.e., the driving-side coupling 144) precesses around the rotation shaft support 132 with the base serving as a fulcrum. In addition, the axial length of the rotating shaft 140 including the driving-side coupling 144 is increased, so that it makes the rotating shaft 140 easier to be elastically deformed as well as makes the driving-side coupling 144 easier to precess.

The support holder 110 also functions as a regulatory member to regulate (adjust) the maximum swing width (tilting angle) of the tip portion of the screw driving gear 108. Specifically, an angle regulator 150 is formed in an annular-projection shape on a front side surface of the gear 142 of the screw driving gear 108 (i.e., a surface facing the back side surface of the support holder 110). On the other hand, a restraining portion 134 is formed in an annular-projection shape at a position corresponding to the angle regulator 150 on the back side surface of the support holder 110. A gap having a predetermined spacing is formed between the angle regulator 150 and the restraining portion 134, so that the screw driving gear 108 can be tilted until the angle regulator 150 abuts to the restraining portion 134. The maximum possible tilt angle of the screw driving gear 108 with respect to the rotating shaft 140 is set to from 0.3° to 1.0°, for example.

In the image forming apparatus 10 described above, as shown in FIG. 14, upon the process unit 70 is installed onto the apparatus body 12, the process unit 70 is connected to the process unit driving device 100. Namely, the photoreceptor coupling 80 of the photoreceptor drum 36 is fitted into the drive coupling 124 of the drum driving gear 106, as well as the driving-side coupling 144 of the screw driving gear 108 is fitted into the driven-side coupling 92 of the screw coupling 88 (i.e., the driving force transmission mechanism 200 can work). Rotational driving force generated by the driving motor 104 is transmitted to the drum shaft 76 of the photoreceptor drum 36 via the drum driving gear 106, as well as transmitted to the screw shaft 84*a* of the delivering screw 84 via the screw driving gear 108, so that the photoreceptor drum 36 and the delivering screw 84 are driven to rotate in a predetermined direction.

Here, when the driving-side coupling 144 of the screw driving gear 108 is fitted into the driven-side coupling 92 of the screw coupling 88, even if the positions of the first engaging members 96 in a direction along the inner circumference coincide with the positions of the second engaging members 148 in a direction along the outer circumference, the second engaging members 148 of the driving-side coupling 144 can be guided into the groove portion between the first engaging members 96 by means of the inclined surface 96*c* of the first engaging member 96 and the third inclined surface 148*b* of the second engaging member 148.

Furthermore, even if the driven-side coupling 92 is attempted to be connected to the driving-side coupling 144 with axial centers thereof being greatly misaligned, the first engaging members 96 of the driven-side coupling 92 slide over the second inclined surfaces 146*a* provided on the body 146 of the driving-side coupling 144, so that the driving-side coupling 144 tilts (precesses) in a direction where the axial center of the driving-side coupling 144 approaches the axial center of the driven-side coupling 92. As a result, the misalignment between the axial center of the driven-side coupling 92 and the axial center of the driving-side coupling 144 is corrected (axially aligned) to some extent.

Furthermore, even if the driven-side coupling 92 is connected to the driving-side coupling 144 with axial centers thereof being misaligned (i.e., the misalignment between the axial centers thereof remains when the connection is completed), the driven-side coupling 92 is axially aligned with the driving-side coupling 144 automatically by means of the first inclined surface 148*a* included in the second engaging members 148 of the driving-side coupling 144 along with the rotation of the driving-side coupling 144.

Figure 15A:
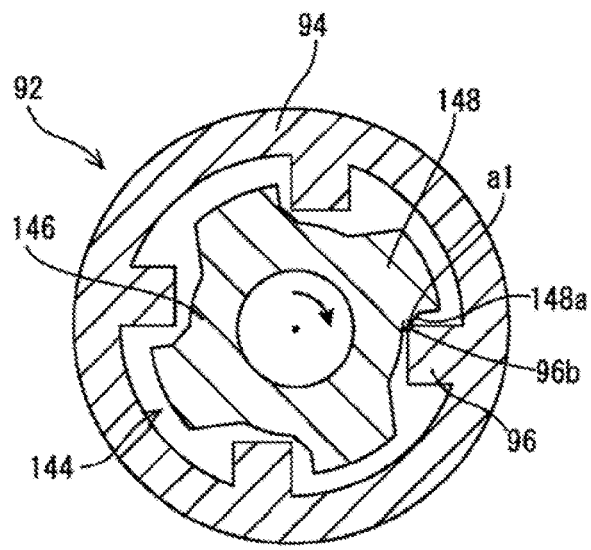
FIGS. 15A, 15B, 15C, and 15D are cross-sectional views schematically illustrating an operation in which the driven-side coupling and the driving-side coupling are axially aligned automatically.

FIGS. 15A, 15B, 15C, and 15D schematically show an operation in which the driven-side coupling 92 and the driving-side coupling 144 are axially aligned automatically with the first inclined surface 148*a*. When the driven-side coupling 92 is connected to the driving-side coupling 144 with the axial centers thereof being misaligned, as shown in FIG. 15A, the inner edge 96*b* of the first engaging member 96 of the driven-side coupling 92, which is at the closest position to the axial center of the driving-side coupling 144, abuts to an abutting point a1 on the first inclined surface 148*a* of the corresponding second engaging member 148 of the driving-side coupling 144.

Figure 15B:
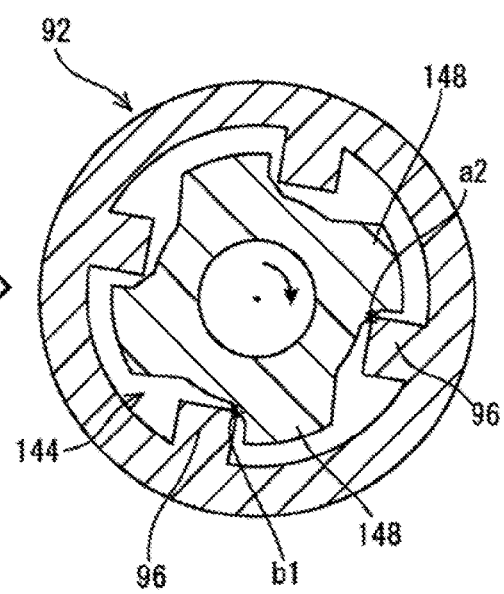

Here, when the driving-side coupling 144 rotates, since the inner edge 96*b* of the first engaging member 96 is abutting to the first inclined surface 148*a*, rotational force of the driving-side coupling 144 acts not only to push the first engaging member 96 in the rotation direction (a direction along the circumference) but also to push the first engaging member 96 in a radially outward direction. Therefore, reaction force thereto, which is force toward the radially inside direction of the driven-side coupling 92, acts on the driving-side coupling 144. As a result, as shown in FIG. 15B, the screw driving gear 108 tilts so that a state abutted at the abutting point a1 becomes a state abutting at an abutting point a2 which is on the upstream side from the abutting point a1 in the rotation direction (i.e., in the radially outward direction). Namely, the screw driving gear 108 precesses so as to be axially aligned. In addition, along with the precessing of the screw driving gear 108, the inner edge 96*b* of the first engaging member 96 of the driven-side coupling 92, which is at the second closest position from the axial center of the driving-side coupling 144, abuts to an abutting point b1 on the first inclined surface 148a of the corresponding second engaging member 148 of the driving-side coupling 144.

Figure 15C:
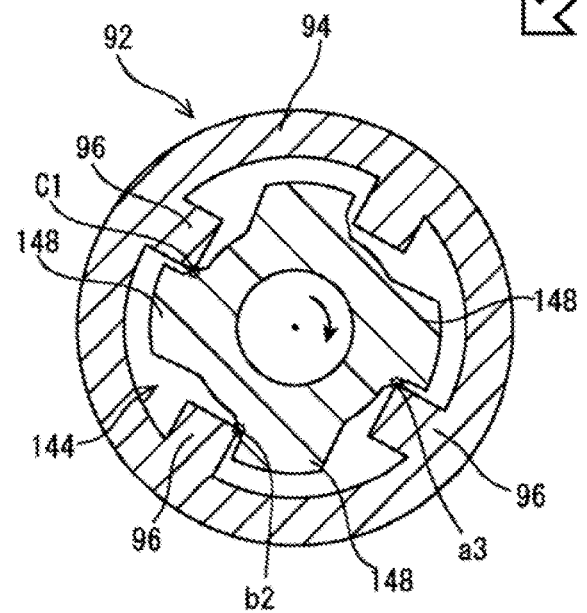

Then, as shown in FIG. 15C, as the rotation of the driving-side coupling 144 advances, the screw driving gear 108 tilts so that a state abutted at the abutting point a2 becomes a state abutting at an abutting point a3, as well as a state abutted at the abutting point b1 becomes a state abutting at an abutting point b2. Namely, the screw driving gear 108 further precesses so as to be more axially aligned. In addition to this, the inner edge 96b of the first engaging member 96 of the driven-side coupling 92, which is at the third closest position from the axial center of the driving-side coupling 144, abuts to an abutting point c1 on the first inclined surface 148a of the corresponding second engaging member 148 of the driving-side coupling 144.

Figure 15D:
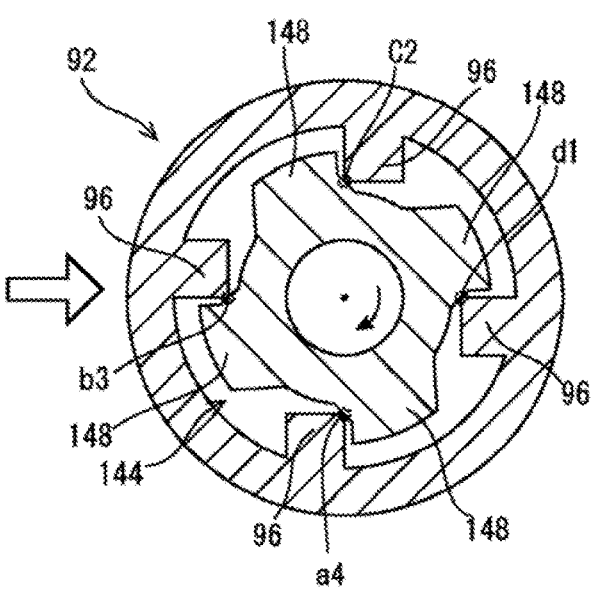

Then, as the rotation of the driving-side coupling 144 further advances, as shown in FIG. 15D, the inner edges 96b of the four first engaging members 96 of the driven-side coupling 92 respectively abut to abutting points a4, b3, c2, and d1 on the first inclined surfaces 148a of the corresponding second engaging members 148 of the driving-side coupling 144. Namely, the axial center of the driven-side coupling 92 comes to be axially aligned with the axial center of the driving-side coupling 144. Thereafter, the screw driving gear 108 continues to rotate while maintaining the tilting, so that rotational driving force can be transmitted to the screw shaft 84a of the delivering screw 84 without rotational unevenness (i.e., fluctuation in a rotational speed).

As described in the foregoing, according to the first embodiment, since the second engaging member 148 of the driving-side coupling 144 has the first inclined surface 148a, even if the axial center of the driven-side coupling 92 is misaligned with the axial center of the driving-side coupling 144, the first inclined surface 148a allows the driven-side coupling 92 to be axially aligned with the driving-side coupling 144 automatically. Therefore, it is possible to reduce or prevent any uneven rotation generated in the screw coupling 88 and smoothly rotate the screw coupling 88 (and thus the screw shaft 84a of the delivering screw 84).

In addition, according to the first embodiment, since the body 146 of the driving-side coupling 144 has a second inclined surface 146a, the driven-side coupling 92 can be axially aligned with the driving-side coupling 144 automatically in more suitable manner.

Second Embodiment

Figure 16:
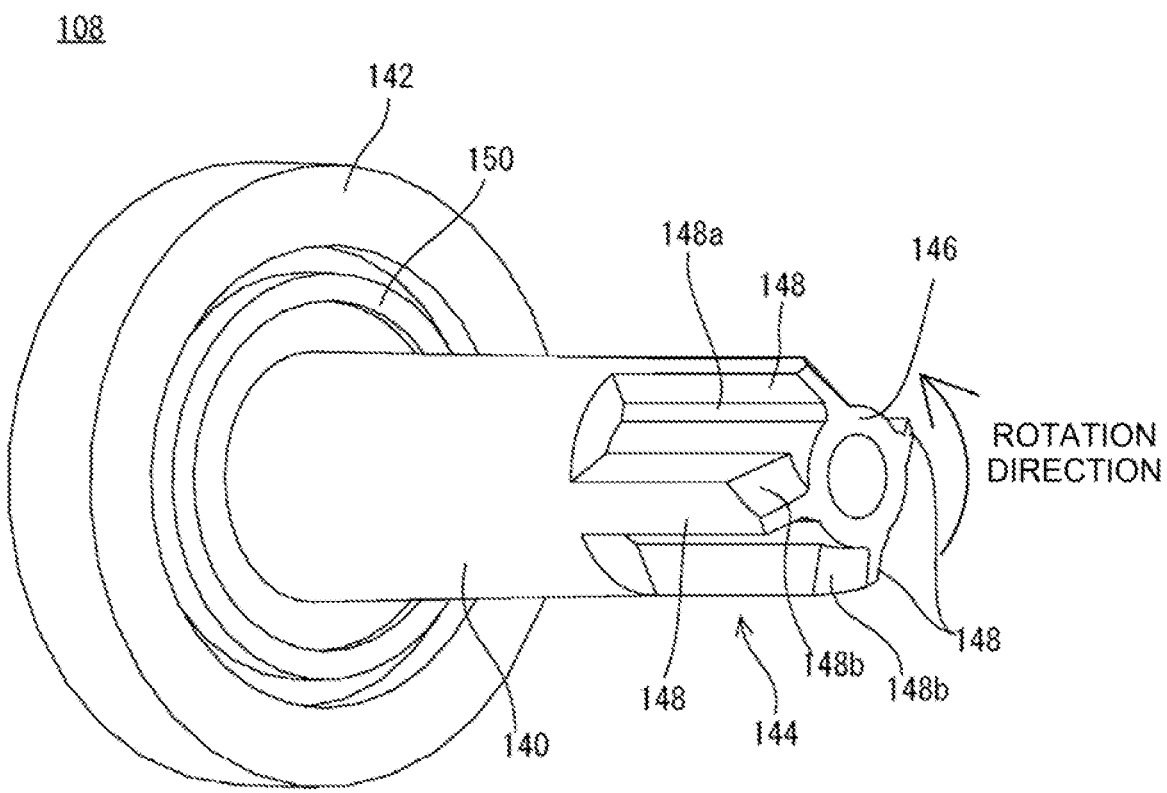
FIG. 16 is a perspective view illustrating the screw driving gear included in an image forming apparatus according to a second embodiment of the present invention.

Next, referring to FIG. 16, the image forming apparatus 10 according to a second embodiment of the present invention is described. In this second embodiment, the configuration of the screw driving gear 108 is different from that of the first embodiment described above. Since the configuration of the second embodiment other than the same is similar to that of the first embodiment, descriptions overlapped to the explanation of the first embodiment described above are omitted or simplified.

In brief, in the second embodiment, the body 146 included in the driving-side coupling 144 of the screw driving gear 108 has the same outer diameter throughout the entire axial length extent. Namely, the second inclined surface 146a is not formed on the body 146.

Also in this second embodiment, similar to the first embodiment, since the driving-side coupling 144 has the first inclined surface 148a, the driven-side coupling 92 can be axially aligned with the driving-side coupling 144 auto-matically, and the rotational unevenness generated in the screw coupling 88 can be reduced or prevented.

In each of the above described embodiments, although a multifunction machine which combines a copier, a facsimile machine, a printer, etc. is illustrated as the image forming apparatus 10, the image forming apparatus 10 may be the multifunction machine which combines any of the copier, the facsimile machine, the printer, etc., or at least two of them.

Furthermore, in each of the above described embodiments, although the driving force transmission mechanism 200 is applied to the screw coupling 88 and the screw driving gear 108, the driving force transmission mechanism 200 can be applied to other power transmission parts of the image forming apparatus 10 as well as to power transmission parts included in any type of device other than the image forming apparatus 10.

The specific numerical values, part shapes and the like described above are mere examples, and can be appropriately changed according to the actual product specifications.

What is claimed is:

1. A driving force transmission mechanism that transmits rotational force of a second rotor to a first rotor by fitting a driving-side coupling included in the second rotor into a driven-side coupling included in the first rotor, wherein
the driven-side coupling comprises:
a cylindrical receiving member; and
a plurality of first engaging members provided on an inner peripheral surface of the receiving member at predetermined intervals in a direction along a circumference of the receiving member and each having an abutting surface parallel to a surface including a rotation axis of the receiving member,
the driving-side coupling comprises:
a cylindrical or columnar body to be inserted into the receiving member; and
a plurality of second engaging members provided on an outer peripheral surface of the body at predetermined intervals in a direction along a circumference of the body and engaging with the plurality of first engaging members;
each of the plurality of second engaging members has at an abutting point on the abutting surface of a corresponding first engaging member a first inclined surface inclined so as to be away from a rotation axis of the body from a downstream side toward an upstream side in a rotation direction of the body, and
wherein the body has on the outer peripheral surface between the plurality of second engaging members a second inclined surface that is inclined so as to approach the rotation axis of the body from a base side toward a tip side of the body.

2. The driving force transmission mechanism according to claim 1, wherein the second rotor comprises:
a rotating shaft whose base end is rotatably supported by a rotational shaft support; and
a gear formed at the base end of the rotating shaft,
the driving-side coupling is formed at a tip of the rotating shaft, and
the second rotor is provided so that the driving-side coupling can precess with the base end of the rotating shaft serving as a fulcrum.

3. The driving force transmission mechanism according to claim 2 further comprising a holder provided so as to cover the gear of the second rotor, wherein the gear has an angle regulator that regulates a precessing angle of the driving-side coupling by abutting to the holder.

4. The driving force transmission mechanism according to claim 1, wherein each of the plurality of second engaging members has at a tip a third inclined surface that is inclined so as to approach a base side of the body from the downstream side toward the upstream side in the rotation direction of the body.

5. An image forming apparatus comprising a driving force transmission mechanism according to claim 1.

6. The image forming apparatus according to claim 5 comprising: an apparatus body; and a detachable device that can be attached to and detached from the apparatus body, wherein the first rotor is provided in the detachable device, and the second rotor is provided in the apparatus body.

7. The image forming apparatus according to claim 6 wherein the detachable device has a positioning member with respect to the apparatus body at a position different from a position that the first rotor is provided at.

* * * * *